US012017774B2

(12) United States Patent
Inuma et al.

(10) Patent No.: US 12,017,774 B2
(45) Date of Patent: Jun. 25, 2024

(54) UNMANNED AERIAL VEHICLE, AERIAL VEHICLE CONTROL SYSTEM AND TRANSPORTATION METHOD

(71) Applicant: Rakuten Group, Inc., Tokyo (JP)

(72) Inventors: Takayoshi Inuma, Tokyo (JP); Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 634 days.

(21) Appl. No.: 17/059,302

(22) PCT Filed: Apr. 25, 2019

(86) PCT No.: PCT/JP2019/017745
§ 371 (c)(1),
(2) Date: Nov. 27, 2020

(87) PCT Pub. No.: WO2020/217417
PCT Pub. Date: Oct. 29, 2020

(65) Prior Publication Data
US 2021/0214082 A1    Jul. 15, 2021

(51) Int. Cl.
*B64D 1/22*        (2006.01)
*B64C 39/02*       (2023.01)
(Continued)

(52) U.S. Cl.
CPC .............. *B64D 1/22* (2013.01); *B64C 39/024* (2013.01); *B64D 9/00* (2013.01); *G05D 1/0022* (2013.01);
(Continued)

(58) Field of Classification Search
CPC .... B64D 1/22; B64D 9/00; B64D 1/12; B64C 39/024; G05D 1/0022; G05D 1/101;
(Continued)

(56) References Cited

U.S. PATENT DOCUMENTS 9,580,173 B1     2/2017  Burgess et al.
9,650,136 B1 *   5/2017  Haskin ................... B64U 10/13
(Continued)

FOREIGN PATENT DOCUMENTS

JP    2016-88675 A    5/2016
JP    2017-87898 A    5/2017
(Continued)

OTHER PUBLICATIONS

Japanese Notice of Reasons for Rejection for 2020-513352 dated Jun. 9, 2020.
(Continued)

*Primary Examiner* — Anne Marie Antonucci
*Assistant Examiner* — Patrick Daniel Mohl
(74) *Attorney, Agent, or Firm* — Sughrue Mion, PLLC

(57) ABSTRACT

An unmanned aerial vehicle according to an aspect of the present invention includes: an aerial vehicle body capable of flying; a winding machine provided to the aerial vehicle body and capable of winding and unwinding a linear member an end of which is connectable to a delivery target; and a fall prevention mechanism provided to the aerial vehicle body and capable of holding the delivery target disconnected from the linear member.

20 Claims, 4 Drawing Sheets

(51) Int. Cl.
*B64D 9/00* (2006.01)
*B64U 10/13* (2023.01)
*B64U 101/60* (2023.01)
*G05D 1/00* (2006.01)

(52) U.S. Cl.
CPC .............. *G05D 1/101* (2013.01); *B64U 10/13* (2023.01); *B64U 2101/60* (2023.01); *B64U 2201/20* (2023.01)

(58) Field of Classification Search
CPC ................ B64U 10/13; B64U 2101/60; B64U 2201/20; B64U 2201/10
See application file for complete search history.

(56) References Cited

U.S. PATENT DOCUMENTS

| | | | |
|---|---|---|---|
| 9,969,494 B1 | 5/2018 | Buchmueller et al. | |
| 10,387,825 B1* | 8/2019 | Canavor | H04W 4/02 |
| 2018/0072417 A1* | 3/2018 | Shannon | B64D 1/22 |
| 2018/0072419 A1 | 3/2018 | Burgess et al. | |
| 2018/0312247 A1 | 11/2018 | Ichihara | |
| 2020/0140245 A1 | 5/2020 | Yasuda | |

FOREIGN PATENT DOCUMENTS

| | | |
|---|---|---|
| JP | 2018-165205 A | 10/2018 |
| JP | 2019-18930 A | 2/2019 |
| KR | 10-1780454 B1 | 9/2017 |
| WO | 2017/078044 A1 | 5/2017 |
| WO | 2017/078118 A1 | 5/2017 |

OTHER PUBLICATIONS

Japanese Notice of Decision to Grant a Patent for 2020-513352 dated Aug. 25, 2020.
International Search Report for PCT/JP2019/017745 dated, Jul. 30, 2019 (PCT/ISA/210).

* cited by examiner

UNMANNED AERIAL VEHICLE, AERIAL VEHICLE CONTROL SYSTEM AND TRANSPORTATION METHOD

CROSS REFERENCE TO RELATED APPLICATIONS

This application is a National Stage of International Application No. PCT/JP2019/017745 filed Apr. 25, 2019.

TECHNICAL FIELD

The present invention relates to an unmanned aerial vehicle, an aerial vehicle control system and a transportation method.

BACKGROUND ART

It has been under consideration to use an aerial vehicle that can fly in an unmanned manner, such as the so-called drone to transport a cargo. For example such an aerial vehicle is provided with a box or the like for accommodating a cargo, and the cargo is delivered to a recipient while the box is opened in a state where the aerial vehicle is on the ground. In this case, a flat place having at least a certain area that allows the aerial vehicle to land is required as a place for delivering the cargo.

In view of this, as disclosed in, for example, Patent Documents 1 and 2 cited below, it has been also under consideration to use an aerial vehicle equipped with a winding machine (winch) which can wind and unwind a linear member, such as a wire or a string, the linear member holding a delivery target (which may include a cargo and a container accommodating the cargo) at its end, whereby the cargo is delivered while the aerial vehicle stays in midair without having to land on the ground. According to this method, it is possible to deliver a cargo, provided that a relatively small space where the delivery target can be placed is available. In addition, depending on the device configuration, it is sometimes possible to deliver the delivery target in a shorter time by unwinding the linear member than by landing the aerial vehicle on the ground, Patent Document 1: Japanese Unexamined Patent Application, Publication No. 2016-88675

Patent Document 2: PCT International Publication No. WO2017/78118

SUMMARY OF INVENTION

Technical Problem

With the device configuration disclosed in Patent Documents 1 and 2, since the delivery target is held by a single linear member during flight of the aerial vehicle, there is a possibility that the delivery target is swayed by an effect of wind or the like and an unexpectedly large load is applied to the linear member or a connection portion between the linear member and the delivery target. Therefore, the linear member of the aerial vehicles disclosed in Patent Documents 1 and 2 may be severed or disconnected from the delivery target during flight.

One or more embodiment of the present invention has been conceived in view of the forgoing background, and an object of one or more embodiment of the present invention is to provide an unmanned aerial vehicle, an aerial vehicle control system and a transportation method which are capable of preventing unintentional falling of a delivery target.

Solution to Problem

An unmanned aerial vehicle according to an aspect of the present invention includes: an aerial vehicle body capable of flying; a winding machine provided to the aerial vehicle body and capable of winding and unwinding a linear member an end of which is connectable to a delivery target; and a fall prevention mechanism provided to the aerial vehicle body and capable of holding the delivery target disconnected from the linear member.

Another aspect of the present invention is directed to an aerial vehicle control system for controlling an unmanned aerial vehicle, the unmanned aerial vehicle including: an aerial vehicle body capable of flying in an unmanned manner; a winding machine provided to the aerial vehicle body and capable of winding and unwinding a linear member an end of which is connectable to a delivery target; and a fall prevention mechanism provided to the aerial vehicle body and capable of holding the delivery target disconnected from the linear member, wherein the aerial vehicle control system causes the fall prevention mechanism to prevent the delivery target from falling, in a state where the winding machine has wound the linear member and has brought the delivery target into a certain proximity to the aerial vehicle body.

Yet another aspect of the present invention is directed to a transportation method for transporting a delivery target using an unmanned aerial vehicle including: an aerial vehicle body capable of flying in an unmanned manner; a winding machine provided to the aerial vehicle body and capable of winding and delivery target; and a fall prevention mechanism provided to the aerial vehicle body and capable of holding the delivery target disconnected from the linear member, wherein the fall prevention mechanism prevents the delivery target from falling, in a state where the winding machine has wound the linear member and has brought the delivery target into a certain proximity to the aerial vehicle body.

Advantageous Effects of Invention

The present invention provides an unmanned aerial vehicle, an aerial vehicle control system and a transportation method which are capable of preventing a delivery target from falling.

DESCRIPTION OF EMBODIMENTS

Figure 1:
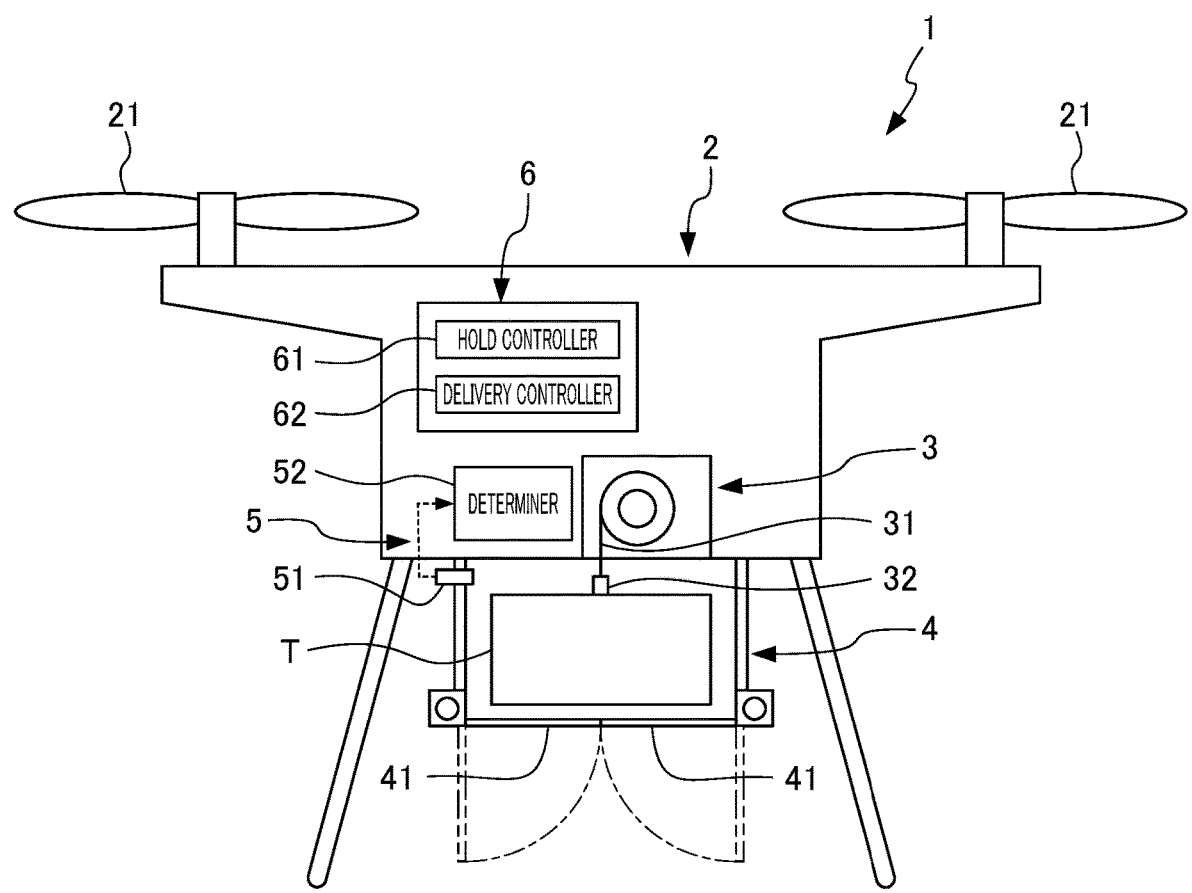
FIG. 1 is a schematic diagram showing a configuration of an unmanned aerial vehicle according to a first embodiment of the present invention.

Non-limiting exemplary embodiments of the present invention will be described below with reference to the drawings. FIG. 1 is a schematic diagram showing a configuration of an unmanned aerial vehicle 1 according to a first embodiment of the present invention. The unmanned aerial vehicle 1 flies while holding a delivery target T, thereby transporting a delivery target T without human intervention.

As shown in FIG. 1, the unmanned aerial vehicle 1 includes: an aerial vehicle body 2 capable of flying in an unmanned manner; a winding machine 3 provided to the aerial vehicle body 2 and capable of winding and unwinding a linear member 31 an end of which is connectable to the delivery target T; a fall prevention mechanism 4 provided to the aerial vehicle body 2 and capable of holding the delivery target T disconnected from the linear member 31. The unmanned aerial vehicle 1 further includes: a connection detection unit 5 configured to detect a state of connection between the delivery target T and the winding machine 3 with the linear member 31 interposed therebetween; and a control device 6 provided in the aerial vehicle body 2 and configured to control the aerial vehicle body 2, the winding machine 3 and the fail prevention mechanism 4.

Although the aerial vehicle body 2 is not particularly limited as long as it can fly in an unmanned manner, the aerial vehicle body 2 of the present embodiment shown in the drawings is an unmanned rotorcraft having a plurality of rotors 21. The aerial vehicle body 2 further includes a battery or the like (not shown) that supplies power for driving the rotors 21.

The winding machine 3 is a winch that can wind the linear member 31 when driven. by a motor (not shown). A flexible member such as a rope or a wire is used as the linear member 31 to be wound by the winding machine 3. The linear member 31 may be tied, at an end portion thereof, to the delivery member 32 provided at the end of the linear member 31 may be a member, such as a hook or a shackle, which is handled by a person to separate the delivery target T. Alternatively the connecting member 32 may have a disconnection mechanism which can disconnect the delivery target T without human intervention. The connecting member 32 has a mechanism for connection, which mechanism may be a mechanical grasping mechanism that uses magnetic force, such as an electromagnet. The delivery target T to be connected to the linear member 31 includes a cargo or a box accommodating the cargo. The box accommodating the cargo may be provided with a member for connection to the linear member 31, such as a hanging ring. This member for connection may be attached using a direct binding band or a packing string for binding the box. Alternatively, the cargo may be directly bound using a binding band or the like, without being accommodated in the box, so that the linear member 31 can be connected to the cargo.

The winding machine 3 may be configured to be able to wind the linear member 31 such that an upper surface of the delivery target T comes into contact with the aerial vehicle body 2 or with a structure fixed to the aerial vehicle body 2, such as a portion of the winding machine 3 or a portion of the fail prevention mechanism 4. Bringing the delivery target T into contact with the aerial vehicle body 2 so that the delivery target T is immobilized and prevented from swinging with respect to the aerial vehicle body 2 allows the unmanned aerial vehicle 1 to fly stably. Thus, the serial vehicle body 2 may hold the delivery target T in a state where the winding machine has wound the linear member 31 to the extent that the delivery target T cannot be brought any closer to the aerial vehicle body 2.

The fall prevention mechanism 4 is capable of preventing the delivery target T from falling by holding the delivery target T even if the delivery target T is disconnected from the linear member 31, in a state where the winding machine 3 has wound the linear member 31 and has brought the delivery target T into a certain proximity to the aerial vehicle body 2. The fall prevention mechanism 4 of the present embodiment is configured to form a clearance between the fall prevention mechanism 4 and a bottom surface of the delivery target T in a state where the winding 3 has raised the delivery target T to the maximum extent. This configuration can avoid a situation in which the connection detection unit 5 to be described later is hindered from detecting a connecting state.

The fail prevention mechanism 4 can be configured to have movable supports 41 that transition between a position for preventing the delivery target T from falling (and descending) and a position for allowing the delivery target T to descend (and fall). Further, the fall prevention mechanism 4 may have a peripheral wall or a cover as a wind shield to reduce a wind force received by the delivery target T, or may be formed into a box shape having an openable bottom serving as a movable support. Alternatively, the fall prevention mechanism 4 may have a separate member that immovably grasps the delivery target T during flight of the unmanned aerial vehicle 1. In addition, the fall prevention mechanism 4 may be configured to allow a side thereof to be opened so that the delivery target T can be inserted and removed through the side while the aerial vehicle body 2 is on the ground.

The movable supports 41 are configured to support at least the bottom of the delivery target T when being in a position for supporting the delivery target T. Alternatively, the movable supports 41 may be configured to contact with side surfaces of the delivery target T so as to limit lateral movement of the delivery target T. The movable supports 41 may also function as a member for immovably grasping the delivery target T during flight. In the latter case, for the detection of a connection state by the connection detection unit 5, the movable supports 41 grasping the delivery target T are preferably configured to transition between three positions: a grasping position in which the movable supports 41 immovably grasp the delivery target T; a fall prevention position in which the movable supports 41 allow the fall prevention mechanism 4 to move the delivery target T upward and downward within. a range corresponding to the clearance between the fall prevention mechanism 4 and the delivery target T, while preventing the delivery target T from falling; and a release state in which the movable supports 41 allow the delivery target T to descend further.

It is also conceivable to prepare a plurality of fall prevention mechanisms 4 of different sizes, from which one selected according to the size of the delivery target T is attached to the aerial vehicle body 2. Alternatively, the fall prevention mechanism 4 may be configured such that the movable supports 41 are replaced in accordance with the size of the delivery target T. Thus, the delivery target T is prevented from being displaced with respect to the aerial vehicle body 2 during flight of the unmanned aerial vehicle 1, whereby the flight of the unmanned aerial vehicle 1 can be stabilized.

The connection detection unit 5 detects a connection state as disconnection of the delivery target T from the winding machine 3 when the delivery target T is separated and the delivery target T is separated from a portion of the linear member 31 remaining connected to the winding machine 3, and when the entire linear linear member 31 and the delivery target T are separated from the winding machine 3. The connection detection unit 5 may be configured to detect the connection state in binary, i.e., whether connected or disconnected, or to detect the connection state in a stepwise manner. The connection detection unit 5 can be configured to have a sensor 51 configured to detect a position of the delivery target T; and a determiner 52 configured to determine the connection state of the delivery target T based on a detection result of the sensor 51.

The sensor 51 can be configured as a sensor which detects a height of a space above the delivery target T. For example, the sensor 51 may be a photoelectric sensor which is disposed to detect that a size of a clearance between the inner surface of the top wall of the fall prevention mechanism 4 and the upper surface of the delivery target T is equal to or greater than a certain value. Alternatively, the sensor 51 may be a gap sensor, such as a distance sensor, which is disposed fixedly with respect to the aerial vehicle body 2 and which measures a distance to the upper surface of the delivery target T. Alternatively, the sensor 51 may be a sensor which detects a height of a space below the delivery target T. For example, the sensor 51 may be a photoelectric sensor which detects the presence of a clearance of a certain size or a larger size between the movable support 41 and the delivery target T. Alternatively, the sensor 51 may be a limit switch or the like which is provided to the movable support 41 and which detects contact of the delivery target T with the movable support 41. Alternatively, the sensor 51 may be a sensor which is provided to the fall prevention mechanism 4 and detects a weight of the delivery target T. For example, the sensor 51 can be configured as a strain sensor or the like which detects a strain applied to the movable support 41 by way of the weight of the delivery target T.

The determiner 52 can be implemented by, for example, an arithmetic device including a CPU, a memory, etc., and having a predetermined program loaded therein. The determiner 52 may be integral with the control device 6 to be described later. That is, the determiner 52 is to be functionally distinguishable, and does not need to be an independent component in terms of mechanical structure and program structures.

The determiner 52 preferably determines the connection state of the delivery target T, while taking account of a state of the winding machine 3. According to the present embodiment, in the case where the sensor 51 is a sensor that detects the height of the space above the delivery target T, the determiner 52 can determine that the delivery target T has been separated if the sensor 51 detects no decrease in the height of the space above the delivery target T when the winding machine 3 has wound the linear member 31. In the case where the sensor 51 is a sensor that detects the height of the space above the delivery target T, the determiner 52 can determine that the delivery target T has been separated if the sensor 51 detects no increase in the height of the space below the delivery target T when the winding machine 3 has wound the Linear member 31. In the case where the sensor 51 is a sensor that detects the weight of the deliver target T, the determiner 52 can determine that the delivery target T has been. separated if the weight detected by the sensor 51 does not decrease. when the winding machine 3 has wound the linear member 31.

The connection detection unit 5 may be configured to detect the connection state between the delivery target T and the winding machine 3, based on a load of the winding machine 3. In this case, the connection detection unit 5 can determine that the delivery target T has been separated from the linear member 31 if a load detected when the winding machine 3 to further wound the linear member 31 to further raise the delivery target T being prevented from falling by the fall prevention mechanism 4 is smaller than a predetermined threshold.

The control device 6 can be implemented by, for example, a computer device including a CPU, a memory, etc., and having a predetermined program loaded therein. The control device 6 may have a communication unit that communicates with an external server vehicle 1. The control device 6 included in the unmanned aerial vehicle 1 of the present embodiment will be described, on the assumption that the control device 6 per se independently constitutes an embodiment of an aerial vehicle control system according to the present invention. In other words, the unmanned aerial vehicle 1 of the present embodiment is configured to be able to fly alone to a destination, to deliver the delivery target T to a recipient, and then, to return to a predetermined distribution center or the like, while being under control of the control device 6, even without instructions sent from the remote control device.

The control device 6 further includes a hold controller 61 which controls motion of the fall prevention mechanism 4 for preventing the delivery target T from falling; and a delivery controller 62 which controls delivery motion of the fall prevention mechanism 4 for delivering the delivery target T to a recipient, based on a detection result of the connection detection unit 5. The hold controller 61 and the delivery controller 62 are to be functionally distinguishable, and do not need to be independent in terms of program structure.

The hold controller 61 controls the fall prevention mechanism 4 to bring the fall prevention mechanism 4 into the position for preventing falling, in a state where the winding machine 3 has wound the linear member 31 and has brought the delivery target T into a certain proximity to the aerial vehicle body 2. In the present embodiment, the hold controller 61 controls the fall prevention mechanism 4 to enable the fall prevention mechanism 4 to hold the delivery target T regardless of separation of the delivery target T from the linear member 31, after the delivery target T has come close to the aerial vehicle body 2 so as to enter a state where the delivery target T can be prevented from falling by the fall prevention mechanism 4. The hold controller 61 may determine that the delivery target T has come into the certain proximity to the aerial vehicle body 2, based on a detection result of the sensor 51 that detects the height of the space above the delivery target T.

The hold controller 61 may be configured to cause the fall prevention mechanism 4 to hold the delivery target T only in the event of separation of the delivery target T from the linear member 31, the event possibly occurring while the winding machine 3 has the delivery target T suspended from the linear member 31. Alternatively, the hold controller 61 may be configured to cause the winding machine 3 to unwind the linear member 31 after closure of the fall prevention mechanism 4, so that the delivery target T is supported on the movable supports 41 of the fall prevention mechanism 4. Supporting of the delivery target T by the movable supports 41 makes it possible not only to reduce relative movement of the delivery target T with respect to the aerial vehicle body 2, but also to reduce a tension in the linear member 31, thereby lowering the risk of separation of the delivery target T which can be caused by severance of the linear member 31.

The delivery controller 62 determines a procedure for controlling the serial vehicle body 2, the winding machine 3 and the fall prevention mechanism 4. The delivery controller 62 has a winching-down control element. In a case where the connection detection unit 5 detects connection between the linear member 31 and the delivery target T when the aerial vehicle body 2 reaches a destination, the winching-down control element causes the fall prevention mechanism 4 to release the delivery target T, and then causes the winding machine to unwind the linear member 31 so that the delivery target T is delivered while the aerial vehicle body 2 is stationary in midair. In this way, without having to land the aerial vehicle body 2, the delivery target T can be made to descend to the ground to be delivered to a recipient.

The delivery controller 62 preferably has a release prohibition control element. In a case the connection detection unit 5 detects separation of the delivery target T from the linear member 31 while the fall prevention mechanism 4 is in the position for preventing the delivery target T from falling, the release prohibition control element prohibits the fall prevention mechanism 4 from releasing the delivery target T while the aerial vehicle body 2 is flying at a certain altitude or a higher altitude. Accordingly, the delivery target T is prevented from falling from a certain height or a higher altitude to be damaged.

The delivery controller 62 may have a destination change control element. In a case where the connection detection unit 5 detects separation of the delivery target T from the linear member while the fall prevention mechanism 4 is in the position for preventing the delivery target T from falling, the destination change control element changes a flight destination of the aerial vehicle body 2. The destination change control element changes the destination of the serial vehicle body 2 to a landing point where the aerial vehicle body 2 can land, so that the aerial vehicle body 2 lands to deliver the delivery target T. In this way, the delivery target can be delivered while being prevented from being damaged by failing. In this case, the delivery controller 62 preferably further includes a change notification control element which notifies the change of the destination to the recipient using a communication unit, The landing point as the destination after the change may be a location selected in advance by the recipient, or a location closest to the original destination, which is selected from a plurality of preset landing points. Thus, the landing point may be set by various methods. The notification is provided to the recipient preferably by way of transmission of information to a terminal such as a smartphone of the recipient through a communication network.

In addition, in the case where the connection detection unit 5 detects separation of the delivery target T from the linear member while the fall prevention mechanism 4 is in the position for preventing the delivery target T from falling, the destination change control element may determine this situation as an emergency, may stop the delivery of the delivery target T to the recipient, and may set the flight destination of the aerial vehicle body 2 to, for example, the location where the fall prevention mechanism 4 has begun to prevent falling of the delivery target T, i.e., where the unmanned aerial vehicle 1 was caused to hold the delivery target T. Alternatively, the destination after the change may be set to another location designation after the change may be set to another location designated by an administrator of the unmanned aerial vehicle 1. Thus, when it is impossible to deliver the delivery target T by normally winching down the delivery target T, the unmanned aerial vehicle 1 once brings the delivery target T back, whereby the delivery target T can be prevented from being damaged. Alternatively, the unmanned aerial vehicle 1 may be controlled to plan for re-delivery after bringing back the delivery target T.

The delivery controller 62 may further have a low-altitude release control element. In the case where the connection detection unit 5 detects separation of the delivery target T from the linear member while the fall prevention mechanism 4 is in the position for preventing the delivery target T from falling, the low-altitude release control element causes the fall prevention mechanism 4 in order to release the delivery target T to deliver the delivery target T, after causing the aerial vehicle body 2 to descend to a predetermined sufficiently low altitude. This configuration makes it possible, without changing the destination, to minimize an impact to be received by the delivery target T upon falling on the ground by reducing the altitude from which the delivery target T falls, whereby the delivery target T can be prevented from being broken. This control is effective when the delivery target T is, for example, a highly urgent cargo such as relief supplies because it is required to deliver the delivery tarter T regardless of damage to a portion of the delivery target T. When a cargo (in particular, relief supplies, etc.) is transported on water, the risk of breakage of the delivery target due to falling is also reduced.

The delivery controller 62 may be preset to change the destination so as to land the aerial vehicle body 2, or to reduce the altitude or the aerial vehicle body 2 and cause the aerial vehicle body 2 in midair to drop the delivery target T, according to the type of the delivery target T. Alternatively, the delivery controller 62 may contact the recipient in response to detection of separation of the delivery target T from the linear member 31, and may follow instructions by the recipient.

Figure 2:
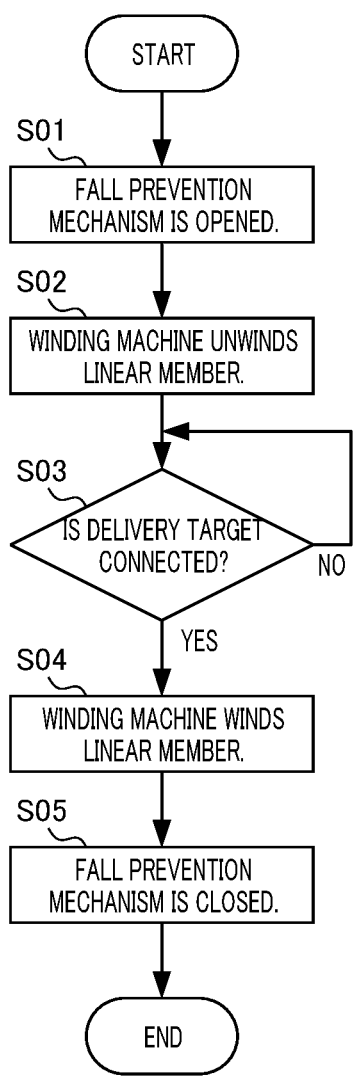
FIG. 2 is a flowchart showing a procedure according to which the unmanned aerial vehicle of FIG. 1 receives a delivery target.

Next, a method for transporting the delivery target T using the unmanned aerial vehicle 1 controlled by the control device 6 will be described. The method for transporting the delivery target T using the unmanned aerial vehicle 1 is an embodiment of the transport method of the present invention. FIG. 2 shows an example of a procedure for receiving the delivery target T, according to the method for transporting the delivery target T. That is, FIG. 2 illustrates a control procedure performed by the hold controller 61 of the control device 6.

In this example, the control by the hold controller 61 includes: a step of opening the fall prevention mechanism 4 (Step S01: receiving-opening step); a step of unwinding the linear member 31 by the winding machine 3 (Step S02: receiving-unwinding step); a step of checking connection of the delivery target T to the linear member 31 (Step S03: receiving-connection checking step); a step of winding the linear member 31 by the winding machine 3 (Step S04: receiving-winding step): and a step of closing the fall prevention mechanism 4 and bringing the same into the position for preventing falling (Step. S05: fall prevention mechanism closing step).

In Step S01 as the receiving-opening step, the movable supports 41 are opened so that the fall prevention mechanism 4 becomes ready to receive therein the delivery target T.

In Step S01 as the receiving-unwinding step, the winding machine 3 is caused to unwind the linear member 31 so that an end portion of the linear member 31 extends to the outside of the fall prevention mechanism 4. This allows an operator to connect the deliver target T to the end of the linear member 31.

In step 03 as the receiving-connection checking step, it is checked whether the delivery target T has been connected to the end of the linear member 31. The connection of the delivery target T may be checked by way of input by the operator or by means of a sensor provided to a member connecting the linear member 31 to the delivery target T. The receiving-connection checking step is repeated until the connection of the delivery target T is confirmed. In order that the connection detection unit 5 repeatedly checks the connection state of the delivery target T, the winding machine 3 may repeat unwinding and winding of the linear member during flight of the unmanned aerial vehicle 1.

In Step S04 as the receiving-winding step, the winding machine 3 is caused to wind the linear member 31 until the delivery target T comes into a certain proximity to the aerial vehicle body 2, specifically, until the delivery target T reaches a position where the fall prevention mechanism 4 can prevent the delivery target T from falling. The position of the delivery target T may be checked by an encoder or the like provided to the winding machine 3. Alternatively, the winding machine 3 may be operated until the connection detection unit 5 detects the delivery target T.

In Step S05 as the fall prevention mechanism closing step, the movable supports 41 of the fall. prevention mechanism 4 are closed so that the fall prevention mechanism 4 holds the delivery target T and prevents the delivery target T from falling even if the delivery target T is separated from the linear member 31. During flight following this step, the delivery target T is held by the linear member 3 and does not need to be supported on the movable supports 41.

Alternatively, while the fall prevention mechanism 4 is in the position for preventing the delivery target T from falling, the winding machine 3 may be caused to slightly unwind the linear member 31 so that the delivery target T is supported on the movable supports 41 to lower the tension in the linear member 31.

Figure 3:
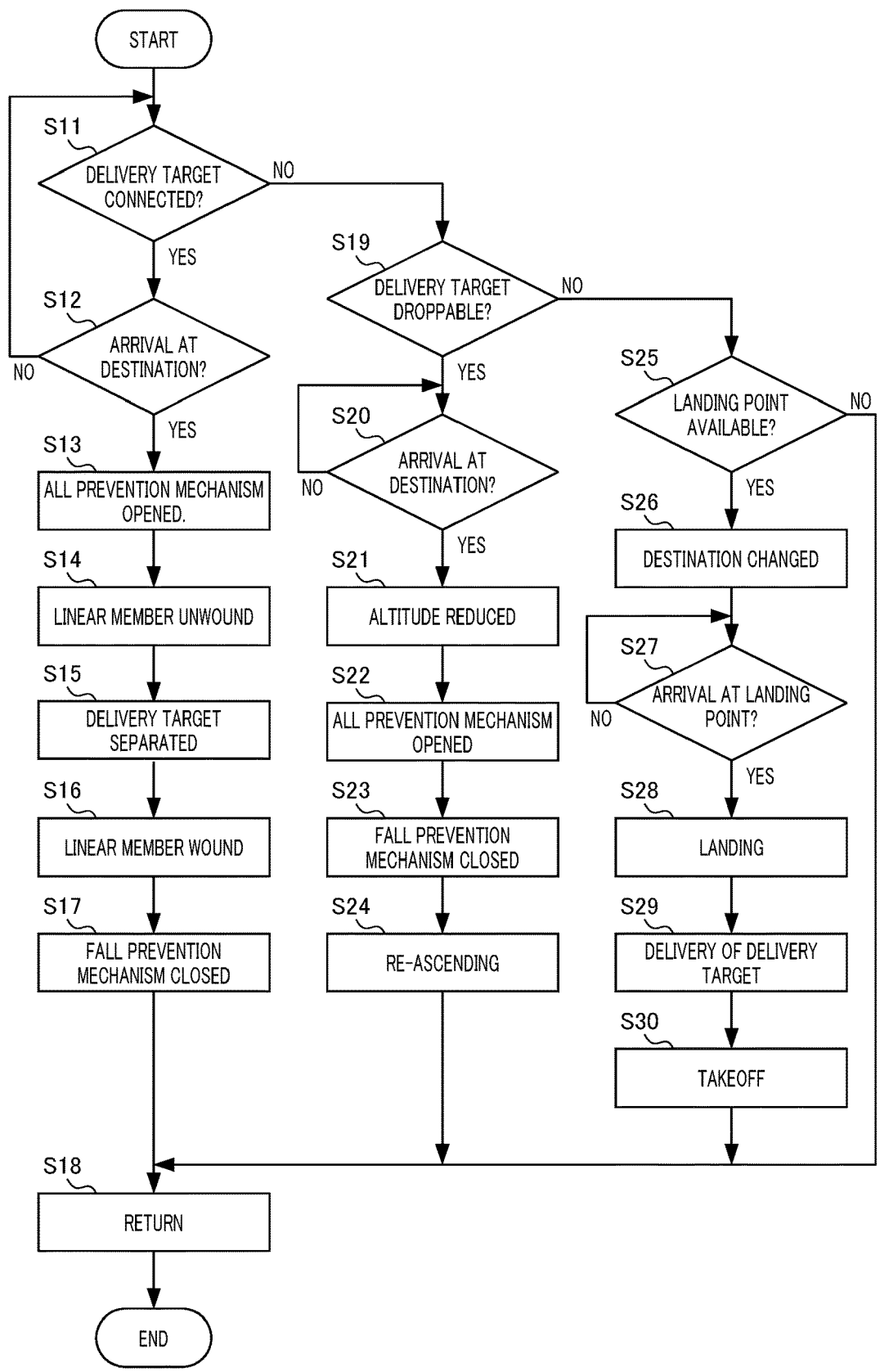
FIG. 3 is a flowchart showing a procedure according to which the unmanned aerial vehicle of FIG. 1 delivers a delivery target.

FIG. 3 shows an example of a procedure for delivering the delivery target T, according to the method for transporting the delivery target T using the unmanned serial vehicle 1. That is, FIG. 3 illustrates a control procedure performed by the delivery controller 62 of the control device 6.

The control associated with delivery of the delivery target T includes: a step of checking the connection state between the delivery target T and the winding machine: 3 (Step S11: connection checking step); a step of checking arrival at airspace above a destination (Step S12: airspace arrival checking step); a step of opening the fall prevention mechanism 4 (Step S13: in-airspace opening step); a step of unwinding the linear member 31 by the winding machine 3 (Step S14: unwinding step); a step of separating the delivery target T from the linear member 31 (Step S15: separation step), a step of winding the linear member 31 by the winding machine 3 (Step S16: winding step), a step of closing the fall prevention mechanism 4 (Step S17: in-airspace closing step); a step of returning the serial vehicle body 2 to a predetermined base or the like, such as the location where the fall prevention mechanism 4 has begun to prevent falling of the delivery target T (the location where the delivery target T was received) after change of a destination (Step S18: return step); a step of checking whether it is possible to drop the delivery target T for delivering the same (Step S19: drop checking step); a step of checking arrival at airspace above the destination (Step S20: dropping-arrival checking step); a step of reducing an altitude of the aerial vehicle body 3 to a predetermined altitude for dropping (Step S21: altitude reducing step); a step of opening the fall prevention mechanism 4 (Step S22: dropping-opening step); a step of closing the fall prevention mechanism 4 (Step S23: dropping-closing step); a step of causing the aerial vehicle body 2 to ascend to the original altitude (Step S24: re-ascending step); a step of checking whether a landing point is available: (Step S25: landing point checking step); a step of changing the destination to the landing point (Step S26: destination changing step); a step of checking arrival at airspace above the landing point (Step 27: landing point arrival checking step); a step of landing the aerial vehicle body 2 (Step S28: landing step); a step of delivering the delivery target T to a recipient (Step S29: delivery step); and a step of causing the aerial vehicle body 2 to take off (Step S30: takeoff step).

I Step S11 as the connection checking step, when the aerial vehicle body 2 is flying, the connection detection unit 5 checks the connection state between the delivery target T and the winding machine 3 while the fall prevention mechanism 4 is in the position for preventing the delivery target T from falling. If the connection between the delivery target T and the linear member 31 is detected in the connection checking step, the procedure proceeds to Step S12. If separation of the delivery target T from the linear member 31 is detected in the connection checking step, the procedure proceeds to Step S19.

In Step S12 as the airspace arrival checking step, it is checked whether the serial vehicle body 2 has arrived at airspace above the destination. If the arrival at the destination is confirmed, the procedure proceeds to Step S13. If it is determined that the aerial vehicle body 2 has not yet arrived at the destination, the procedure returns to Step S11.

In Step S13 as the in-airspace opening step, in order to prepare for delivery of the delivery target T, the fall prevention mechanism 4 is opened so that the delivery target T is released to become ready to descend.

In Step S14 as the unwinding step, the winding machine 3 unwinds the linear member 31 to cause the delivery target T to descend to the ground, while the aerial vehicle body 2 is hovering in the airspace above the destination.

In Step S14 as the unwinding step, the winding machine 3 unwinds the linear member 31 to cause the delivery target T to descend to the ground, while the aerial vehicle body 2 is hovering in the airspace above the destination.

In Step S15 as the separation step, a disconnection mechanism of the connecting member 32 is actuated to separate the delivery target T from the linear member 31. In a case where the connecting member 32 has no disconnection mechanism, the recipient needs to perform work to separate the delivery target T from the linear member 31. Therefore, the separation step serves as a step of waiting until separation of the delivery target T is confirmed by way of, for example, input by the recipient.

In Step S16 as the winding step, the winding machine 3 winds the linear member 31 from which the delivery target T has been separated. This step causes the linear member 31 not to hang down, thereby facilitating flight of the aerial vehicle body 2.

In Step S17 of the in-airspace closing step, the fall prevention mechanism 4 is closed. This step reduces the air resistance of the fall prevention mechanism 4, thereby further facilitating flight of the serial vehicle body 2.

In Step S18 as the return step, the flight destination is reset to, for example, a. distribution center or the like where the delivery target T was received by the unmanned aerial vehicle 1, whereby the unmanned aerial vehicle 1 returns to the distribution center or the like.

In Step S19 as the drop checking step, setting is checked to determine whether the delivery target T can be dropped. If it is determined that the delivery target T can be dropped, the procedure proceeds to Step S20. If it is determined that the delivery target T cannot be dropped, the procedure proceeds to Step S25.

In Step S20 as the dropping-arrival checking step, it is checked whether the aerial vehicle body 2 has arrived at airspace above the destination. The dropping-arrival checking step is repeated until the arrival at the destination is confirmed.

In Step S21 as the altitude reducing step, the altitude of the aerial vehicle body 2 is reduced to a predetermined altitude for dropping. This step leads to a decrease in an impact to be received by the delivery target T at the time of being dropped in the next dropping-opening step. In Step S22 as the dropping-opening step, the fall prevention mechanism 4 is opened so that the delivery target T separated from the linear member 31 is released and dropped on the ground.

In Step S23 as the dropping-closing step, the fall prevention mechanism 4 is closed. In Step S24 as the re-ascending step, the aerial vehicle body 2 is caused to re-ascend to the flight altitude. After the aerial vehicle body 2 has re-ascended, the procedure proceeds to Step S18, in which the unmanned aerial vehicle 1 returns to the distribution center or the like.

In Step S25 as the landing point checking step, it is. checked whether any available landing point is set near the destination. In this landing point checking step, if a landing point is set, it is conceivable to ask, via a communication line, the recipient whether the recipient agrees to delivery of the delivery target T at the landing point instead of the destination. If the delivery of the delivery target T at the landing point is accepted, the procedure proceeds to Step S26. If the delivery of the delivery target T at the landing point is not accepted, the procedure proceeds to Step S18, in which the unmanned aerial vehicle 1 returns to the distribution center or the like. In the latter case, the unmanned aerial vehicle 1 brings the delivery target T back.

In Step S26 as the destination changing step, the flight destination is changed to an available landing point. Consequently, the aerial vehicle body 2 starts to move the landing point. The landing point that is the destination after change is notified to the recipient.

In Step S27 as the landing point arrival checking step, it is checked whether the aerial vehicle body 2 has arrived at airspace above the destination after the change, i.e., airspace above the landing point. This landing point arrival checking step is repeated until the arrival at the airspace above the landing point is confirmed. Once the arrival at the airspace above the landing point is confirmed, the procedure proceeds to Step S25, in which the aerial vehicle body 2 is landed on the ground.

In Step 329 as the delivery step, the delivery target T is delivered to the recipient while the aerial vehicle body 2 is on the ground. The delivery of the delivery target T may be performed by way of opening of the fall prevention mechanism 4, unwinding of the linear member 31 by the winding machine 3, and separation of the delivery target T from the linear member 31 by the connecting member 32. Alternatively, the recipient may open a side of the fall prevention mechanism 4 so that the delivery target T is delivered. In the latter case, the delivery step is repeated until completion of the delivery of the delivery target T is confirmed by way of, for example, input by the recipient.

In Step S30 as the takeoff step, the aerial vehicle body 2 takes off. Once the aerial vehicle body 2 has taken off, the procedure proceeds to Step S18, in which the unmanned aerial vehicle 1 returns to the distribution center or the like.

As can be seen from the foregoing, the unmanned aerial vehicle 1, the aerial vehicle control system (the control device 6) and the transportation method according to the present embodiment can prevent unintentional falling of the delivery target T.

Figure 4:
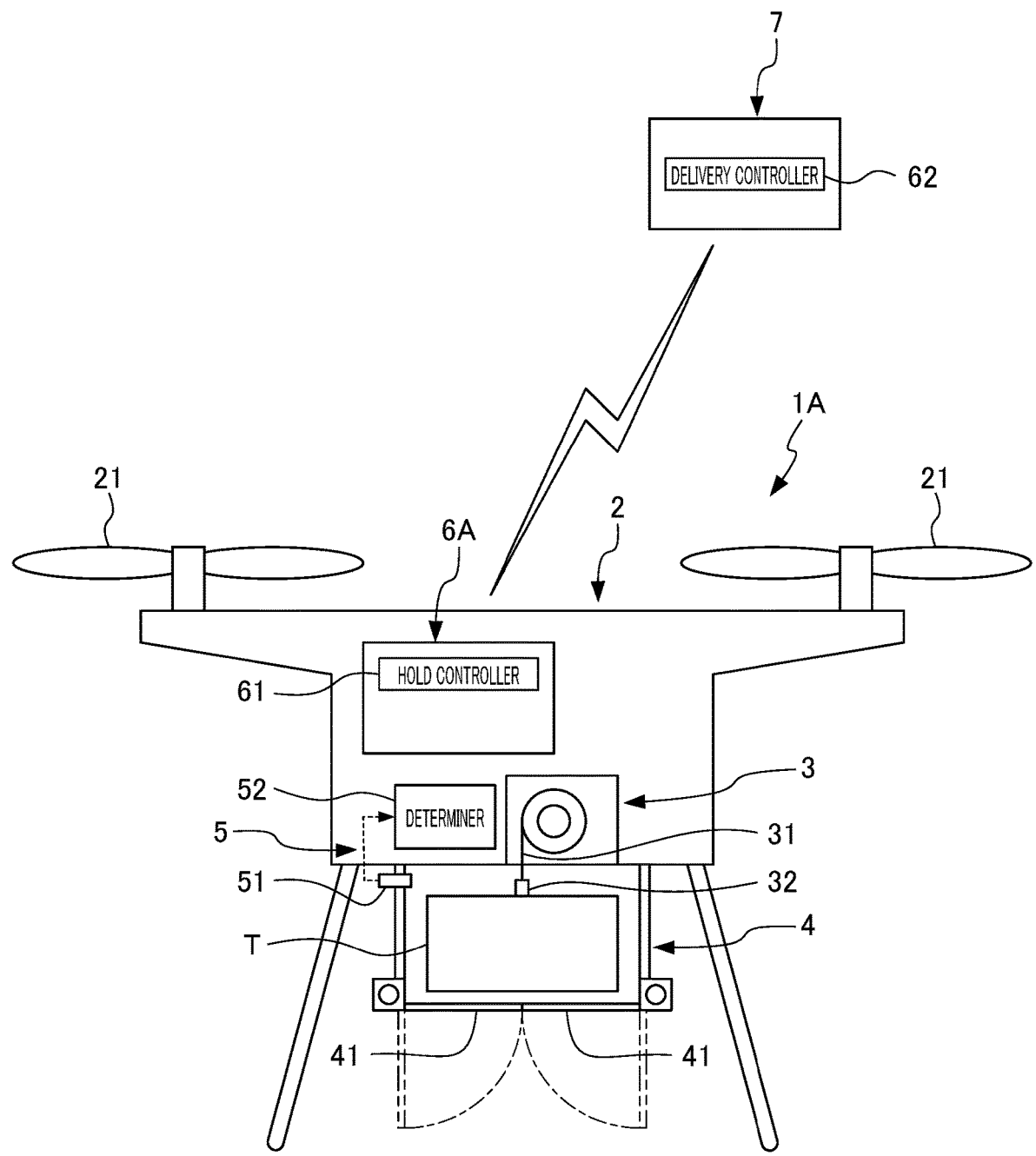
FIG. 4 is a schematic diagram showing a configuration of a transportation system including an unmanned aerial vehicle according to a second embodiment of the present invention.

FIG. 4 is a schematic view showing a configuration of a transportation system including an unmanned serial vehicle 1A according to a second embodiment of the present invention. The transportation system includes the unmanned aerial vehicle 1A and a remote control device 7 provided away from the unmanned aerial vehicle 1A.

The unmanned aerial vehicle 1A includes: an aerial vehicle body 2 capable of flying in an unmanned manner; a winding machine 3 provided to the aerial vehicle body 2; a fall prevention mechanism 4 provided to the aerial vehicle body 2; a connection detection unit 5 configured to detect a connection state of a delivery target T; a local control device 6A provided to the aerial vehicle body 2 and configured to control the aerial vehicle body 2, the winding machine 3 and the fall prevention mechanism 4.

The configurations of the aerial vehicle body 2, the winding machine 3, th fall prevention mechanism 4 and the connection detection unit 5 of the unmanned aerial vehicle 1A shown in FIG. 4 are the same or similar to those of the aerial vehicle body 2, the winding machine 3, the fall prevention mechanism 4 and the connection detection unit 5 of the unmanned aerial vehicle 1 shown in FIG. 1. Therefore, in the description of the unmanned aerial vehicle 1A of FIG. 4, the same components as those of the unmanned aerial vehicle 1 of FIG. 1 are denoted by the same reference characters, and overlapping description will be omitted.

The local control device 6A and the remote control device 7 of the present embodiment constitute an embodiment of the aerial vehicle control system of the present invention. That is, in the transportation system of the present embodiment, the local control device 6A and the remote control device 7 cooperate to control the unmanned aerial vehicle 1A.

The local control device 6A included in the unmanned aerial vehicle 1A of FIG. 4 corresponds to the control device 6 of the unmanned aerial vehicle 1 of FIG. 1 from which part of the functions thereof, such as the delivery controller 62, is omitted. That is, the local control device 6A of the unmanned aerial vehicle 1A of FIG. 4 differs only in control program from. the control device 6 of the unmanned aerial vehicle 1 of FIG. 1.

The remote control device 7 wirelessly communicates with the local control device 6A, and provides the local control device 6A with instructions on at least part of a control procedure of the unmanned aerial vehicle 1A. Specifically, the remote control device 7 has the function (i.e., the delivery controller 62), which is omitted from the local control device 6A but included in the control device 6 of the unmanned aerial vehicle 1 of FIG. 1, and provides the local control device 6A with instructions based on a result of control by the function, and thereby causes the unmanned aerial vehicle 1A of FIG. 4 to perform the same transportation operation as that performed by the unmanned aerial vehicle 1 of FIG. 1. Due to not being mounted on the unmanned aerial vehicle 1A, the remote control device 7 can be configured to determine the transportation procedure of the delivery target T by the unmanned aerial vehicle 1A based on more information.

Like the unmanned aerial vehicle 1, the control device 6 and the transportation method according to the first embodiment, the unmanned aerial vehicle 1A, the aerial vehicle control system and the transportation method according to the present embodiment can prevent unintentional falling of the delivery target T.

As can be appreciated from the foregoing decryption, the following configurations exert respective advantageous effects.

As unmanned aerial vehicle (1, 1A) according to an embodiment of the present invention includes an aerial vehicle body (2) capable of flying; a winding machine (3) provided to unwinding a linear member (31) and end of which is connectable to a delivery target (T); and a fall prevention mechanism (4) provided to the aerial vehicle body (2) and capable of holding the delivery target (T) disconnected from the linear member (31). Thus, the unmanned aerial vehicle (1, 1A) can prevent unintentional falling of the delivery target (T) by the fall prevention mechanism (4) even if the delivery target (T) is separated due to, for example, severance of the linear member (31), etc., so that the delivery target (T) can be safely transported to a destination.

The unmanned serial vehicle (1, 1A) further includes: a control device (6, 6A) configured to control the aerial vehicle body (2), the winding machine (3) and the fall prevention mechanism (4), wherein the control device (6, 6A) controls the fall prevention mechanism (4) to bring the fall prevention mechanism (4) into a position for preventing the delivery target (T) from falling, in a state where the winding machine (3) has wound the linear member (31) and has brought the delivery target (T) into a certain proximity to the aerial vehicle body (2). This feature enables the unmanned aerial vehicle (1, 1A) to reliably prevent unintentional falling of the delivery target (T).

The unmanned aerial vehicle (1) further includes a connection detection unit (5) configured to detect a connection state between the delivery target (T) and the winding machine (3) while the fall prevention mechanism (4) is in the position for preventing the delivery target (T) from falling, wherein the control device (6) controls the aerial vehicle body (2), the winding machine (3) or the fall prevention mechanism (4) based on a detection result of the connection detection unit (5). This feature enables the unmanned aerial vehicle (1) to safely deliver the delivery target (T) to a recipient even when the delivery target (T) is separated from the winding machine (3).

In the unmanned aerial vehicle (1), if separation of the delivery target (T) from the winding machine (3) is detected while the fall prevention mechanism (4) is in the position for preventing the delivery target (T) from falling, the control device (6) prohibits the fall prevention mechanism (4) from releasing the delivery target (T) during flight of the aerial vehicle body (2) at a certain altitude or a higher altitude. This feature enables the unmanned aerial vehicle (1, 1A) to prevent the delivery target (T) from falling from a high place to be damaged.

In the unmanned aerial vehicle (1), if separation of the delivery target (T) from the winding machine (3) is detected while the fall prevention mechanism (4) is in the position for preventing the delivery target (T) from falling, the control device (6) may land the aerial vehicle body (2) in order to deliver the, delivery target (T). This feature enable the unmanned aerial vehicle (1) to safely deliver the delivery target (T) to the recipient.

In the unmanned aerial vehicle (1), if separation of the delivery target (T) from the winding machine (3) is detected while the fall prevention mechanism (4) is in the position for preventing the delivery target (T) from falling, the control device (6) may change the destination of the aerial vehicle body (2). With this feature, the unmanned aerial vehicle (1) can safely deliver the delivery target (T) to the recipient, and in a case where safety delivery is impossible, can bring the delivery target (T) back to a distribution center or the like, whereby the delivery target (T) can be protected.

In the unmanned aerial vehicle (1), the control device (6) can notify the change of the destination. With this feature, the unmanned aerial vehicle (1) can reliably deliver the delivery target (T) to the recipient even if the destination is changed.

In the unmanned aerial vehicle (1), a destination after the change may be a location where the prevention of falling of the delivery target (T) has begun. With this feature, the unmanned aerial vehicle (1) can bring the delivery target (T) back go a distribution center or the like, whereby the delivery target (T) can be protected.

In the unmanned aerial vehicle (1), the destination after the change may be a landing point set as a location allowing the aerial vehicle body (2) to land thereon. With this feature, the unmanned aerial vehicle (1) can deliver the delivery target (1) to the recipient while preventing damage to the delivery target (T).

In the unmanned aerial vehicle (1), if separation of the delivery target (T) from the winding machine (3) is detected while the fall prevention mechanism (4) is in the position for preventing the delivery target (T) from falling, the control device (6) may cause the fall prevention mechanism (4) to release the delivery target (T) after reducing an altitude of the aerial vehicle body (2) to a predetermined altitude. With this feature, the unmanned aerial vehicle (1) can quickly deliver the delivery target (T) to the recipient while reducing damage to the delivery target (T).

In the unmanned aerial vehicle (1), if the connection detection unit (5) detects connection between the linear member (31) and the delivery target (T) after arrival of the aerial vehicle body (2) at the destination, the control device (6) causes the fall prevention mechanism (4) to release the delivery target (T), and then, causes the winding machine (3) to unwind the linear member (31) in order to deliver the delivery target (T) while the aerial vehicle body (2) is stationary in midair. This feature enables the unmanned aerial vehicle (1) to deliver the delivery target (T) at a location where landing is impossible.

In the unmanned aerial vehicle (1), the connection detection unit (5) may detect the connection state between the delivery target (T) and the winding machine (3) based on a height of a space above the delivery target (T). This feature enables the unmanned aerial vehicle (1) to detect the connection state of the delivery target (T) relatively easily.

In the unmanned aerial vehicle(1), the connection detection unit (5) may have a sensor provided to the fall prevention mechanism (4) and configured to detect a weight of the delivery target (T). This feature also enable the unmanned aerial vehicle . to detect the connection state of the delivery target (T) relatively easily.

In the unmanned vehicle (1), the connection detection unit (5) may detect the connection state between the delivery target (T) and the winding machine (3) based on a load of the winding machine (3). This feature allows the unmanned aerial vehicle (1) to detect the connection state of the delivery target (T) with a simple construction.

In the unmanned aerial vehicle (1), the connection detection unit (5) may detect the connection state between the delivery target (T) and the winding machine (3) when the winding machine (3) has wound the linear member (31). This feature makes it possible to detect the connection state between the delivery target (T) and the winding machine (3) further accurately.

An aerial vehicle control system according to an embodiment of the present invention is intended to control an unmanned aerial vehicle (1, 1A). The unmanned aerial vehicle (1, 1A) includes: an aerial vehicle body (2) capable of flying in an unmanned manner; a winding machine (3) provided to the aerial vehicle body (2) and capable of winding and unwinding a linear member (31) an end of which is connectable to a delivery target (T); and a fall prevention mechanism (4) provided to the aerial vehicle body (2) and capable of preventing falling of the delivery target (T) disconnected from the linear member (31), wherein the aerial vehicle control system causes the fall prevention mechanism (4) to prevent the delivery target (T) from falling, in a state where the winding machine (3) has wound the linear member (31) and has brought the delivery target (T) into a certain proximity to the aerial vehicle body (2). Thus, the aerial vehicle control system according to the embodiment of the present invention can prevent unintentional falling of the delivery target (T) by the fall prevention mechanism (4) even if the delivery target (T) is separated due to severance or the like of the linear member (31), so that the unmanned aerial vehicle (1, 1A) can safely transport the delivery target (T) to a destination.

The aerial vehicle control system may include: a local control device (6A) provided to the aerial vehicle body (2) and configured to control the aerial vehicle body (2) and configured to control the aerial vehicle body (2), the winding machine (3) and the fall prevention mechanism (4); and a remote control device (7) provided away from the unmanned aerial vehicle (1A) and configured to communicate with the local control device (6A) and to provide the local control device (6A) with instructions on at least part of a control procedure. This feature enables the remote control device (7) to optimize the transportation procedure for the delivery target (T) based on more information.

A transportation method according to an embodiment of the present invention is intended to transport a delivery target (T) using an unmanned aerial vehicle (1, 1A). The unmanned aerial vehicle (1, 1A) includes: an aerial vehicle body (2) capable of flying in an unmanned manner; a winding machine (3) provided to the aerial vehicle body (2) and capable of winding and unwinding a linear member (31) an end of which is connectable to the delivery target (T); and a fall prevention mechanism (4) provided to the aerial vehicle body (2) and capable of holding the delivery target (T) disconnected from the linear member (31). The fall prevention mechanism (4) prevents the delivery target (T) from falling, in a state where the winding machine (3) has wound the linear member (31) and has brought the delivery target (T) into a certain proximity to the aerial vehicle body (2). Thus, the transportation method according to the embodiment of the present invention can prevent unintentional falling of the delivery target (T) by the fall prevention mechanism (4) even if the delivery target (T) is separated due to severance or the like of the linear member (31), so that the unmanned serial vehicle (1, 1A) can safely transport the delivery target (T) to a destination.

Two embodiments of the present invention have been described in the foregoing. However, the present invention is not limited to the above-described embodiments, but encompasses variations, improvements and the like within the scope in which the object of the present invention can be achieved.

In the unmanned aerial vehicle 1, 1A according to an embodiment of the present invention, the aerial vehicle body 2 is not limited to an unmanned rotorcraft, but may be, for example, an unmanned airship or the like.

In the unmanned aerial vehicle 1, 1A according to an embodiment of the present invention, the fall prevention mechanism (4) may be closed by way of operation by an operator, instead of control by the control device 6, 6A.

In the unmanned aerial vehicle 1, 1A, the aerial vehicle control system and the transportation system according to an embodiment of the present invention, if separation of the delivery target T from the winding machine 3 is detected while the fall prevention mechanism 4 is in the position for preventing falling of the delivery target T, the destination may be changed to another location and the delivery target T may be dropped from a low altitude.

In the unmanned aerial vehicle 1, 1A, the aerial vehicle control system and the transportation system according to an embodiment of the present invention, the fall prevention mechanism 4 may be opened after landing of the aerial vehicle body 2.

In the unmanned aerial vehicle 1, 1A, the aerial vehicle control system and the transportation system according to an embodiment of the present invention, it is conceivable that after arrival. at airspace above the original destination, the connection detection unit 5 detects the connection state of the delivery target T, and a procedure for delivering the delivery target T is determined. Thus, the connection detection unit 5 may detect the connection state constantly, periodically, or at an optional timing.

In the unmanned aerial vehicle 1, 1A, the aerial vehicle control system and the transportation system according to an embodiment of the present invention, it is conceivable to take flight, while a connection state between the linear member 31 and the delivery target T is maintained, and the movable supports 41 in a closed state support the delivery target T from below. In this case, control may be performed such that after the delivery target T is winched up to a predetermined position and the fall prevention mechanism 4 is closed, the linear member 31 unwound until the deliver target T comes into contact with the movable supports 41. Once the flight is continued until arrival at airspace above a destination while the fall prevention mechanism 4 supports the delivery target T, the linear member 31 is wound up to a predetermined position, and then, the connection detection unit 5 detects the connection state, so that a delivery method can be determined. This control reduces a load applied to the linear member 31, thereby contributing to prolongation of the service line of the linear member 31. Alternatively, it is conceivable to periodically repeat the following series of operations: after the delivery target T supported on the fax prevention mechanism 4 is raised to a predetermined position, if detection of connection state indicates that a suitable connection state is maintained and no abnormality is present, the linear member 31 is unwound so that the delivery target T is again supported on the fall prevention mechanism 4.

Explanation of Reference Numerals

1A: Unmanned Aerial Vehicle
2: Aerial Vehicle Body
31: Linear Member
32: connecting Member
4: Fall Prevention Mechanism
41: Movable Support
5: Connection Detection Unit
51: Sensor
52: Determiner
6, 6A: Control Device
61: Hold Controller
62: Deliver Controller
7: Remote Control Device
T: Delivery Target

The invention claimed is:

1. An unmanned aerial vehicle comprising:
an aerial vehicle body capable of flying;
a winding machine provided to the aerial vehicle body and capable of winding and unwinding a linear member an end of which is connectable to a delivery target;

a fall prevention mechanism provided to the aerial vehicle body and configured to prevent the delivery target from falling when the linear member is disconnected, a control device configured to control the aerial vehicle body, the winding machine and the fall prevention mechanism, the control device including a first processor and a first memory;

a connection detection unit configured to detect a connection state between the delivery target and the winding machine while the fall prevention mechanism is in the position for preventing the delivery target from failing, the connection detection unit including a second processor and a second memory; and wherein, the control device controls the aerial vehicle body, the winding machine or the fall prevention mechanism based on a detection result of the connection detection unit.

2. The unmanned aerial vehicle according to claim 1, wherein the control device controls the fall prevention mechanism to bring the fall prevention mechanism into a position for preventing the delivery target from falling, in a state where the winding machine has wound the linear member and has brought the delivery target into a certain proximity to the aerial vehicle body.

3. The unmanned aerial vehicle according to claim 1, wherein if separation of the delivery target from the winding machine is detected while the fall prevention mechanism is in the position for preventing the delivery target from falling, the control device prohibits the fall prevention mechanism from releasing the delivery target during flight of the aerial vehicle body at a certain altitude or a higher altitude.

4. The unmanned aerial vehicle according to claim 1, wherein if separation of the delivery target from the winding machine is detected while the fall prevention mechanism is in the position for preventing the delivery target from falling, the control device lands the aerial vehicle body in order to deliver the delivery target.

5. The unmanned aerial vehicle according to claim 1, wherein if separation of the delivery target from the winding machine is detected while the fall prevention mechanism is in the position for preventing the delivery target from falling, the control device changes a destination of the aerial vehicle body.

6. The unmanned aerial vehicle according to claim 5, wherein the control device notifies change of the destination.

7. The unmanned aerial vehicle according to claim 5, wherein a destination after the change is a location where prevention of falling of the delivery target has begun.

8. The unmanned aerial vehicle according to claim 5, wherein a destination after the change is a landing point set as a location allowing the aerial vehicle body to land thereon.

9. The unmanned aerial vehicle according to claim 1, wherein if separation of the delivery target from the winding machine is detected while the fall prevention mechanism is in the position for preventing the delivery target from falling, the control device causes the fall prevention mechanism to release the delivery target after reducing an altitude of the aerial vehicle body to a predetermined altitude in order to deliver the delivery target.

10. The unmanned aerial vehicle according to claim 1, wherein if the connection detection unit detects connection between the linear member and the delivery target after arrival of the aerial vehicle body at a destination, the control device causes the fall prevention mechanism to release the delivery target, and then, causes the winding machine to unwind the linear member in order to deliver the delivery target while the aerial vehicle body is stationary in midair.

11. The unmanned aerial vehicle according to claim 1 wherein the connection detection unit detects the connection state between the delivery target and the winding machine based on a height of a space above the delivery target.

12. The unmanned aerial vehicle according to claim 1, wherein the connection detection unity detects the connection state between the delivery target and the winding machine based on a load of the winding machine.

13. The unmanned aerial vehicle according to claim 1, wherein the connection detection unit has a sensor provided to the fall prevention mechanism and configured to detect a weight of the delivery target.

14. The unmanned aerial vehicle according to claim 1, wherein the connection detection unity detects the connection state between the delivery target and the winding machine when the winding machine has wound the linear member.

15. The unmanned aerial vehicle according to claim 3, wherein the connection detection unit detects the connection state between the delivery target and the winding machine when the winding machine has wound the linear member.

16. The unmanned aerial vehicle according to claim 1, wherein, responsive to a separation of the delivery target from the winding machine being detected while the fall prevention mechanism is in a position for preventing the delivery target from falling, the control device is configured to prohibit the fall prevention mechanism from releasing the delivery target during flight of the aerial vehicle body above a predetermined altitude.

17. The unmanned aerial vehicle according to claim 1, further comprising a sensor, wherein, when the linear member is severed and the delivery target is supported by the fall prevention mechanism, a weight of the delivery target applied to a movable support is detected by the sensor, and wherein the fall prevention mechanism comprises the movable support.

18. An aerial vehicle control system for controlling an unmanned aerial vehicle, a remote control device configured to provide a control to the unmanned aerial vehicle, the remote control device including a first processor and a first memory; and the unmanned aerial vehicle comprising:

an aerial vehicle body capable of flying in an unmanned manner;

a winding machine provided to the aerial vehicle body and capable of winding and unwinding a linear member an end of which is connectable to a delivery target;

a fall prevention mechanism provided to the aerial vehicle body and configured to prevent the delivery target from falling when the linear member is disconnected, wherein the aerial vehicle control system causes the fall prevention mechanism to prevent the delivery target from falling, in a state where the winding machine has wound the linear member and has brought the delivery target into a certain proximity to the aerial vehicle body, and a connection detection unit configured to detect a connection state between the delivery target and the winding machine while the fall prevention mechanism is in the position for preventing the delivery target from falling, the connection detection unit including a second processor and a second memory, wherein, the remote control device controls the aerial vehicle body, the winding machine or the fall prevention mechanism based on a detection result of the connection detection unit.

19. The aerial vehicle control system according to claim 18, the unmanned aerial vehicle further comprising:

a local control device provided to the aerial vehicle body and configured to control the aerial vehicle body, the winding machine and the fall prevention mechanism, the local control device including a second processor and a second memory.

20. A method for transporting a delivery target using an unmanned aerial vehicle, the method comprising:

winding a winding machine of the unmanned aerial vehicle until the winding machine has wound a linear member connected to the delivery target and has brought the delivery target into a certain proximity to an aerial vehicle body of the unmanned aerial vehicle;

determining that the delivery target has become disconnected from the winding machine;

determining that the delivery target is droppable;

determining that the unmanned aerial vehicle has arrived at a destination;

reducing an altitude of the unmanned aerial vehicle;

opening a fall prevention mechanism of the unmanned aerial vehicle so that the delivery target is allowed to fall;

closing the fall prevention mechanism; and re-ascending.

* * * * *